(12) United States Patent
Ropolyi et al.

(10) Patent No.: US 8,306,199 B2
(45) Date of Patent: Nov. 6, 2012

(54) ACCOUNTING IN A TRANSIT NETWORK

(75) Inventors: Robert Ropolyi, Budapest (HU); Jozsef Varga, Nagydobsza (HU)

(73) Assignee: Nokia Corporation, Espoo (FI)

( * ) Notice: Subject to any disclaimer, the term of this patent is extended or adjusted under 35 U.S.C. 154(b) by 1213 days.

(21) Appl. No.: 11/907,781

(22) Filed: Oct. 17, 2007

(65) Prior Publication Data

US 2008/0101568 A1    May 1, 2008

Related U.S. Application Data

(60) Provisional application No. 60/852,968, filed on Oct. 20, 2006.

(51) Int. Cl.
*H04M 15/00* (2006.01)
*G01R 31/08* (2006.01)
*G06F 13/00* (2006.01)

(52) U.S. Cl. .................. 379/114.01; 370/230; 370/252; 370/390; 370/426; 370/522; 379/112.09; 379/229; 455/16; 455/406; 455/452.1; 455/500; 705/1.1; 709/225; 709/227; 709/229; 709/235; 709/238; 726/6

(58) Field of Classification Search .................. 370/230, 370/235, 238, 242, 252, 255, 385, 426, 522; 370/390, 392; 379/112.09, 114.01, 229; 455/16, 452.1, 500, 406; 705/1.1; 709/227, 709/229, 235, 238, 225; 726/6

See application file for complete search history.

(56) References Cited

U.S. PATENT DOCUMENTS

| | | | | |
|---|---|---|---|---|
| 6,396,807 B1* | 5/2002 | Peligry et al. | .................. | 370/230 |
| 7,260,061 B2* | 8/2007 | Pellert | .................. | 370/230 |
| 7,400,888 B2* | 7/2008 | Smith et al. | .................. | 455/452.1 |
| 7,403,537 B2* | 7/2008 | Allison et al. | .................. | 370/426 |
| 7,471,636 B2* | 12/2008 | Vasseur et al. | .................. | 370/242 |
| 7,486,668 B2* | 2/2009 | Reichbauer | .................. | 370/385 |
| 7,590,732 B2* | 9/2009 | Rune | .................. | 709/225 |
| 7,729,261 B2* | 6/2010 | Rajsic et al. | .................. | 370/238 |
| 7,877,493 B2* | 1/2011 | Quinlan | .................. | 709/229 |
| 7,912,732 B1* | 3/2011 | Cahn | .................. | 705/1.1 |
| 2001/0050981 A1* | 12/2001 | Gonzales et al. | .................. | 379/112.09 |
| 2002/0051425 A1* | 5/2002 | Larsson | .................. | 370/252 |
| 2002/0103924 A1* | 8/2002 | Nomura | .................. | 709/235 |
| 2002/0137459 A1* | 9/2002 | Ebata et al. | .................. | 455/16 |
| 2002/0181462 A1* | 12/2002 | Surdila et al. | .................. | 370/392 |
| 2002/0186665 A1* | 12/2002 | Chaffee et al. | .................. | 370/255 |
| 2003/0103531 A1* | 6/2003 | Reichbauer | .................. | 370/522 |

(Continued)

OTHER PUBLICATIONS

3GPP TS 24.220, version 7.5.1, "3rd Generation Partnership Project; Technical Specification Group Core Network and Terminals; IP multimedia call control protocol based on Session Initiation Protocol (SIP) and Session Description Protocol (SDP); Stage 3", Oct. 2006.

*Primary Examiner* — Gerald Gauthier

(74) *Attorney, Agent, or Firm* — Mintz, Levin, Cohn, Ferris, Glovsky & Popeo, P.C.

(57) ABSTRACT

An accounting function in a network between originating and terminating networks is disclosed. A transit network node is provided with an appropriate indication regarding its role in inter-operator accounting, for example if it should act as an intermediary node or not. A transit network node configured to function in an appropriate manner to function in an intermediary role in the inter-operator accounting is also disclosed. The intermediary role can be optional.

27 Claims, 4 Drawing Sheets

U.S. PATENT DOCUMENTS

| | | | |
|---|---|---|---|
| 2003/0195981 A1* | 10/2003 | Graf et al. | 709/238 |
| 2004/0029601 A1* | 2/2004 | O'Neill et al. | 455/500 |
| 2004/0077333 A1* | 4/2004 | Koskinen et al. | 455/406 |
| 2004/0240658 A1* | 12/2004 | Delaney et al. | 379/229 |
| 2005/0058068 A1* | 3/2005 | Ben Ali et al. | 370/230 |
| 2006/0034171 A1* | 2/2006 | Rajsic et al. | 370/235 |
| 2006/0174009 A1* | 8/2006 | Martiquet et al. | 709/227 |
| 2007/0160049 A1* | 7/2007 | Xie et al. | 370/390 |
| 2008/0101568 A1* | 5/2008 | Ropolyi et al. | 379/114.01 |
| 2009/0125995 A1* | 5/2009 | Vercellone et al. | 726/6 |

* cited by examiner

ACCOUNTING IN A TRANSIT NETWORK

CROSS-REFERENCE TO RELATED APPLICATIONS

This application claims priority of U.S. Provisional Patent Application Ser. No. 60/852,968, filed on Oct. 20, 2006. The subject matter of the above referenced applications is incorporated by reference.

BACKGROUND

1. Field of the Invention

The disclosure relates to accounting in a communication system and in particular to accounting in a network between originating and terminating networks.

2. Description of the Related Art

A communication system can be seen as a facility that enables communication sessions between two or more entities such as user equipment and/or other nodes associated with the communication system. The communication may comprise, for example, communication of voice, data, multimedia and so on. Establishment of a communications session generally enables a user to be provided with various services. A session may, for example, be a telephone call between users or multi-way conference session, or a communication session between one or more user equipments and an application server (AS), such as a service provider server.

A communication system typically operates in accordance with a given standard and/or specifications which set out what the various entities associated with the communication system are permitted to do and how that should be achieved. For example, a standard or specification may define if the user, or more precisely, user equipment is provided with a circuit switched service and/or a packet switched service. Communication protocols and/or parameters which shall be used for the connection may also be defined.

A user may access the communication system based on different access technologies. For example, a user may access the communication system via a wireless access network or a fixed line access system. Regardless the access technology, one or more gateway functions are typically provided for interconnecting a plurality of networks. For example, if a requested service is provided by a service provider connected to another network, the service request is routed via one or more networks and gateways there between to the network of the service provider. Thus a communication session may be provided via a plurality of networks. It is also possible to route communication sessions via networks that are operated by different operators. The networks may be provided with own control functions and may be operated relatively independently from each other and based on different standards and protocols.

The so called multimedia services are an example of services that may be offered for a user of a communication system. An example of communication systems enabled to offer multimedia services are known as Internet Protocol (IP) Multimedia networks. IP Multimedia (IM) functionalities can be provided by means of an IP Multimedia Core Network (CN) subsystem, or briefly IP Multimedia subsystem (IMS). The IMS includes various network entities for the provision of the multimedia services. The IMS services are intended to offer, among other services, IP connections for mobile user equipment. The Third Generation Partnership Project (3GPP) has defined a reference architecture for the third generation (3G) core network which will provide the users of user equipment with access to the multimedia services. This core network is divided into three principal domains. These are the Circuit Switched (CS) domain, the Packet Switched (PS) domain and the Internet Protocol Multimedia (IM) domain. It is expected that various types of services are to be provided by means of different Application Servers (AS) over systems such as those based on the IMS.

An IP Multimedia subsystem (IMS) network is typically configured to support the Session Initiation Protocol (SIP). The SIP is developed by the Internet Engineering Task Force (IETF). Session Initiation Protocol (SIP) is an application-layer control protocol for creating, modifying and terminating sessions with one or more participants (endpoints). SIP was generally developed to allow for initiating a session between two or more endpoints in the Internet by making these endpoints aware of the session semantics. A user connected to a SIP based communication system may communicate with various entities of the communication system based on standardised SIP messages. User equipment or users that run certain applications on the user equipment are registered with the SIP backbone so that an invitation to a particular session can be correctly delivered to these endpoints. To achieve this, SIP provides a registration mechanism for devices and users, and it applies mechanisms such as location servers and registrars to route the session invitations appropriately. Examples of the possible sessions that may be provided by means of SIP signalling include Internet multimedia conferences, Internet telephone calls, and multimedia distribution.

A transit IP Multimedia subsystem (IMS) functionality has also been introduced in the Third Generation Partnership Project (3GPP) specifications. A transit IMS functionality may be provided in a network that is between networks of two other operators. A number of general cases exists in which IMS may be used for a transit network support. In accordance with a possibility an IMS operator provides transit functionality to other network operators. In other words, an operator serves as an IMS session based routing backbone for another networks, for example a public land mobile network (PLMN), a public switched telephone network (PSTN) or an internet protocol (IP) network and provides connectivity to the endpoints of the other networks. Traffic from e.g. a PSTN operator may arrive at an appropriate gateway which may translate it to be in accordance with the SIP, if this is required. The operator then routes the traffic to the destination network depending on the terminating endpoint.

Certain issues relating to charging and accounting of charges in a transit network, however, remain yet unsolved. For example, at the current proposals, SIP session handling mechanisms do no support charging by transit networks. Thus inter-operator accounting may be considerably hindered or even blocked if a transit IP Multimedia subsystem (IMS) is used in a SIP session/transaction. For example, operators providing IMS transit functionality may follow different approaches regarding inter-operator accounting. Another example of a feature where the operators may differ from one another is whether a transit IMS network operator has an intermediary role in the inter-operator accounting or not.

SUMMARY OF THE INVENTION

The embodiments aim to address one of more of the above issues.

In accordance with an embodiment a transit network node is provided with an appropriate indication regarding its expected role in inter-operator accounting. The node may be provided with an indication if it should act as an intermediary node or not. The transit network node may be configured to function in an appropriate manner to function in an intermediary role in the inter-operator accounting, should this be required there from.

In accordance with a method for a communication system is provided, the method comprising receiving a message in a transit network node of a transit network, obtaining from the message information about the expected role of the transit node in inter-operator accounting, and determining the role of the transit node in inter-operator accounting. Subsequently to the determining a predefined identifier of the transit network may be send to at least one other network in response to determination that the transit network node has an intermediary role or an identifier of at least one other network can be forwarded from the transit network in response to determination of a non-intermediary role.

In accordance with another embodiment a transit network node configured to provide an intermediary in an inter-operator accounting is provided. The transit node is configured to obtain information regarding its expected role in inter-operator accounting from a message and to provide inter-operator accounting based on the information such that a predefined identifier of the transit network is sent to at least one other network in response to determination that the transit network node has an intermediary role and an identifier of at least one other network is forwarded to at least one other network when a non-intermediary role is assumed.

In accordance with a further embodiment a node for a communication system comprising at least an originating network, a transit network and a terminating network is provided. The node is configured to process information regarding expected inter-operator accounting role of a node in the transit network by at least one of including into a message the information and interpreting from a message the information and to exchange the message with the transit network.

In accordance with a yet further embodiment there is provided a communication system comprising at least an originating network, a transit network and a terminating network. The originating network and the terminating network can comprise a node configured to process information regarding expected inter-operator accounting role of a node in the transit network by at least one of including into a message the information and interpreting from a message the information. The transit network can comprise a node configured to obtain information regarding the expected role of the node in inter-operator accounting and to provide inter-operator accounting based on the information such that a predefined identifier of the transit network is sent to at least one other network in response to determination that the node has an intermediary role and an identifier of at least one other network is forwarded to at least one other network when a non-intermediary role is assumed.

In further embodiments a program product comprising machine readable program code for causing performing of steps of obtaining from a message received in a node of a transit network information about the expected role of the node in inter-operator accounting, determining the role of the transit node in inter-operator accounting, and subsequently either sending a predefined identifier of the transit network to at least one other network in response to determination that the transit network node has an intermediary role, or forwarding an identifier of at least one other network from the transit network in response to determination of a non-intermediary role. A processor comprising means for performing the similar steps may also be provided.

In a more specific embodiment the role is determined based on an identifier associated with a network. The identifier can comprise an inter operator identifier (IOI). Sending of a predefined identifier of the transit network can comprise sending a type 2 inter operator identifier to at least one of a controller node of an originating network and a controller node of a terminating network. Sending of a predefined identifier of the at least one other network may comprise transparently forwarding a type 2 inter operator identifier to at least one of a controller node of an originating network and a controller node of a terminating network.

In response to detection at a transit network node that it has an intermediary role, it may send accounting related information to a charging domain. An indication of accounting direction may be included into the information communicated to the charging domain. A direction attribute may be attached to an inter operator identifier (IOI) attribute. In accordance with an embodiment the charging domain is provided with an indication of the direction from or to which the IOI information was exchanged. For example, the new attribute value pair may have a value such as UPSTREAM to reflect that the IOI attribute serves for accounting with the originating/previous transit node and revenue share is expected to be received. Alternatively, an indication such as DOWNSTREAM may be used to indicate that the pair of IOI was exchanged with a terminating or next transit network.

The configuration may be such that the intermediary role of a transit node is optional, and is triggered only in response to a predefined event.

In accordance with an embodiment a new information entity is associated with an indicator of a relevant transit network. For example, a new attribute value pair (AVP) may be included to an Inter-Operator-Identifier (IOI) attribute value pair besides an originating-IOI/terminating-IOI attribute value pairs.

When processing, for example, SIP sessions/transactions, a transit node may handle the inter-operator-identifiers (IOIs) in accordance with its accounting role. In case it is decided that an intermediary role shall be used, the transit-node exchanges its type2 IOIs with appropriate controller nodes of at least one of the originating network and terminating network. If no intermediary role is involved, the transit node may forward the type2 IOI attributes received from originating and terminating networks in a transparent way.

According to another embodiment a new operator or network identifier is used for enabling accounting in a transit network. For example, a new type of an Inter-Operator-Identifier (IOI) may be provided. In this case, the use of a new IOI type attribute may reflect a "pure transit", i.e. not intermediary, role. The new attribute can be exchanged between the originating or terminating network and a transit network.

BRIEF DESCRIPTION OF THE DRAWINGS

For better understanding of the invention, reference will now be made by way of example to the accompanying drawings in which.

DESCRIPTION OF EXEMPLIFYING EMBODIMENTS

Certain embodiments will be described by way of example, with reference to the exemplifying architecture of IP Multimedia subsystem (IMS) networks. The third generation partnership project (3GPP) has defined use of the general packet radio service (GPRS) for providing access to the IMS services, and thus this is used in here as an example of a possible backbone communication network enabling the IMS services for users. However, it will be understood that similar principles may be applied to any other suitable form of a communication system comprising a plurality of networks.

Figure 1:
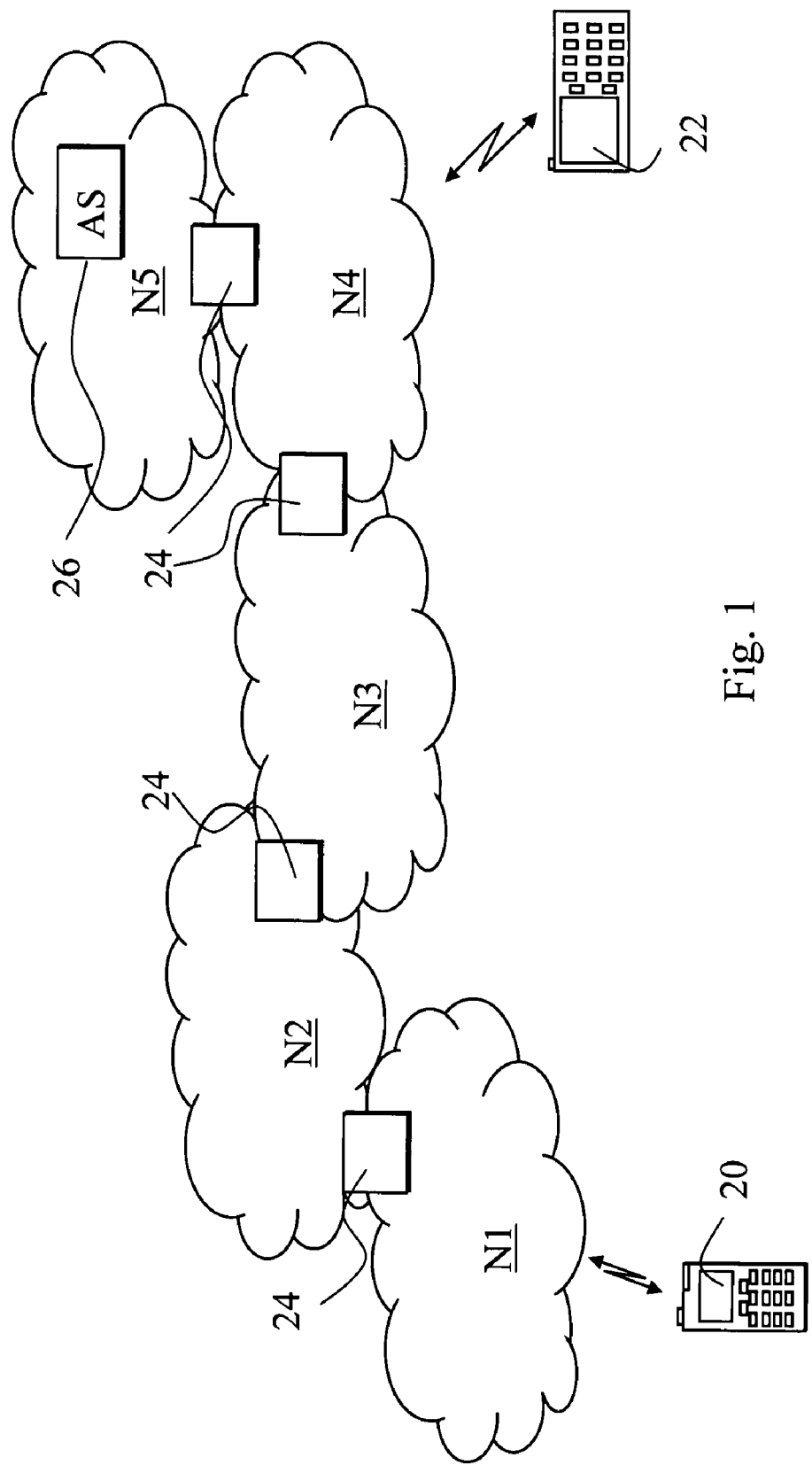
FIG. 1 shows an example for a possible network system.

An exemplifying communication system architecture is shown in FIG. 1. The shown system includes five networks N1 to N5. The networks are interconnected via appropriate gateway nodes 24. In this example a user equipment 20 is connected to a first network N1, and can communicate with a second user equipment 22 via the interconnected networks N1 to N4. The user equipment 20 may also communicate with an application server (AS) 26 provided in a data network N5. An application server 26 may provide various services for user equipment having access thereto. It is noted that the number of interconnected networks can be substantially larger than what is shown in FIG. 1.

The exemplifying general packet radio service (GPRS) operation environment comprises one or more sub-network service areas, which are interconnected by a GPRS backbone network. A sub-network comprises a number of packet data nodes. The GPRS services allow packet data transmission between user equipment 20, 22 such as mobile data terminals and external data networks N5. A packet data session is established to carry traffic flows over the network system. Such a packet data session is often referred as a packet data protocol (PDP) context. A PDP context may include a radio access bearer provided between the user equipment and the appropriate elements of the access system.

IP Multimedia subsystem (IMS) functionalities can be provided by means of various entities. For example, the functions may be provided by network entities known as servers. Therefore, for example, in the current third generation (3G) wireless multimedia network architectures several different servers can be used for handling different functions. These include functions such as call session control functions (CSCFs) shown in FIGS. 2 and 3. The call session control functions may be divided into various categories such as a proxy call session control function (P-CSCF), interrogating call session control function (I-CSCF), and serving call session control function (S-CSCF). It shall be appreciated that similar functions may be referred to in different systems with different names. For example, in certain applications the CSCFs may be referenced to as the call state control functions.

A user equipment 20, 22 may access the communication system via a wireless or fixed interface. Any appropriate mobile or fixed communication device adapted for Internet Protocol (IP) communication may be used to connect to the access network. For example, a user may access a network by means of a user equipment such as a Personal computer (PC), a Personal Data Assistant (PDA), a multimedia terminal, a mobile station (MS) and so on. The following non-limiting examples are described in the particular context of services available for mobile stations.

One skilled in the art is familiar with the features and operation of a typical mobile station, and thus, it is sufficient to note that the user may use a mobile station for tasks such as for making and receiving phone calls, for receiving and sending data from and to the network and for experiencing e.g. multimedia content. A mobile station is typically provided with processor and memory means for accomplishing these tasks. A mobile station may include antenna means for wirelessly receiving and transmitting signals from and to base stations of the mobile communication network. A mobile station may also be provided with a display for displaying images and other graphical information for the user of the mobile user equipment. Speaker means may are also be provided. The operation of a mobile station may be controlled by means of an appropriate user interface such as control buttons, voice commands and so on.

A communication system may be arranged such that a user who has been provided with required communication resources by the backbone network has to initiate the use of services by sending a request for the desired service over the communication system. For example, a user may request for a session, transaction or other type of communications from an appropriate network entity. As explained before, a requested service may be provided by a service provider entity connected to another network.

Figure 2:
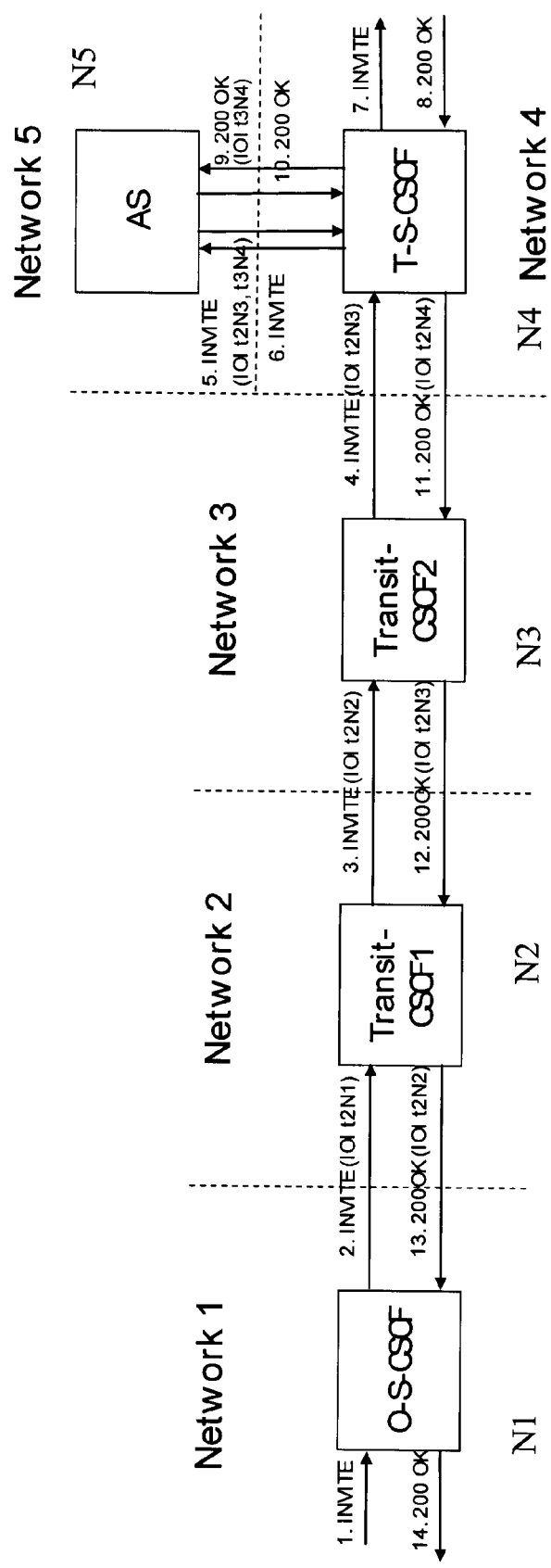
FIG. 2 shows a possible procedure for transit node accounting.
Figure 3:
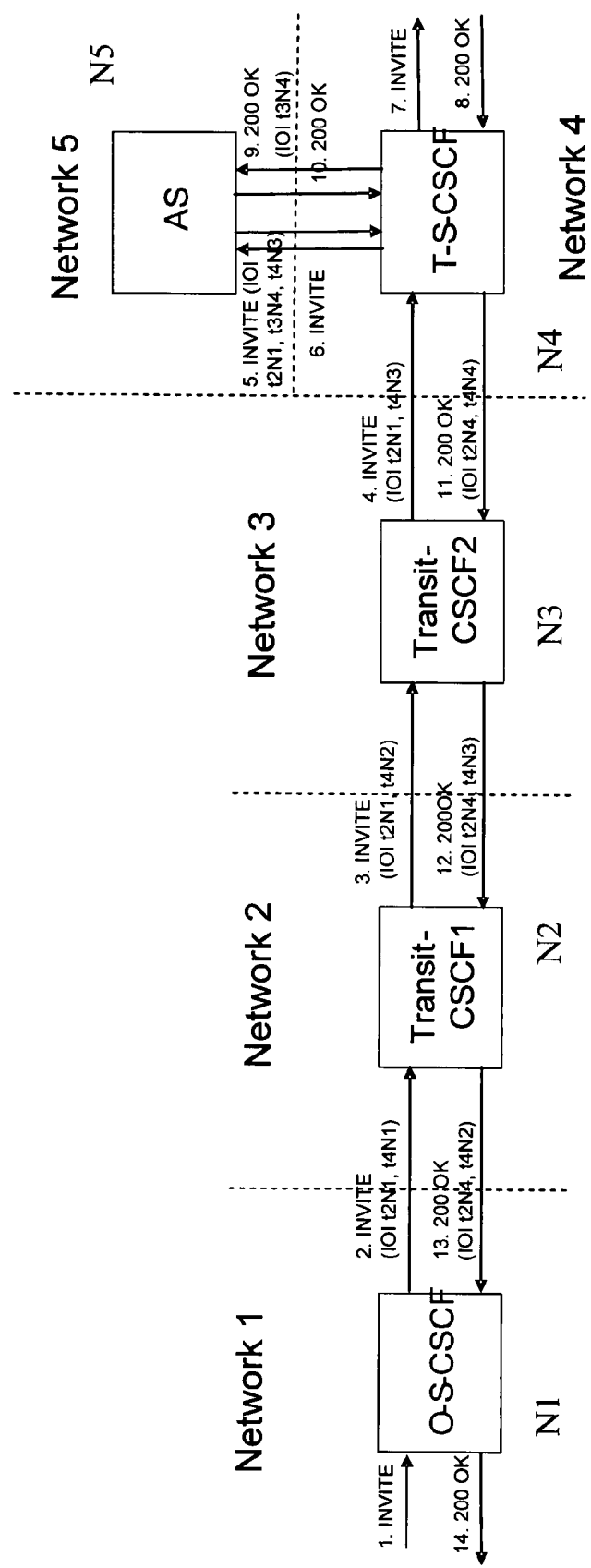
FIG. 3 shows another possible procedure for transit node accounting.

FIGS. 2 and 3 show in detail examples how a service request by a user equipment 20 of FIG. 1 connected to network N1 to a service provided by an application server (AS) 26 connected to network N5 may be routed via a number of networks. Thus a communication session may need to be provided via a plurality of networks N1 to N5.

As shown in FIGS. 2 and 3, the networks can be provided with their own control functions. The networks may be operated relatively independently from each other. It is also possible to route communication sessions via networks that are operated by different operators. To facilitate interoperation of a number of networks, the relevant standards and protocols define certain mechanisms, protocols and attributes that shall be supported by the networks, such as globally recognizable identifiers.

An inter operator identifier (IOI) is an example of a globally unique identifier that can be shared between entities such as sending and receiving networks, service providers and/or content providers. To give an example of the use of the inter operator identifiers, a reference is made to 3GPP technical specification TS 24.229 Version 7.5.1, section 4.5.4 "Inter operator identifier (IOI)" defining a use scenario thereof. In accordance with this exemplifying scenario, a sending network populates an attribute from the originating node (orig-ioi) of a P-Charging-Vector header in a request, thereby identifying the operator network from which the request originated. An attribute associated with the termination node (term-ioi) is left out of the header in this request. The sending network retrieves the terminating identifier attribute from a P-Charging-Vector header within a message that is sent in response identifying the network from which the response was sent. The receiving network can then retrieve the originating network identifier attribute from the P-Charging-Vector header in the request, which identifies the operator network from which the request originated. The receiving network populates the term-ioi attribute of the P-Charging-Vector header in the response to the request, which identifies the operator network from which the response was sent.

3GPP defines three different types of inter operator identifiers. A type 1 Inter Operator Identifier (IOI) is communicated between a P-CSCF and a S-CSCF in the home network. The P-CSCF may also be located in a visited network. This parameter is exchanged in SIP REGISTER requests and responses. A type 2 IOI is communicated between a S-CSCF of the originating network and the S-CSCF of the terminating network or between the S-CSCF of the originating network and a gateway function when a call/session is terminated or between the gateway and the S-CSCF of the terminating network when a call/session is originated or with an application server when accessed via an I-CSCF node. This information can be exchanged in all session-related and session-unrelated requests and responses. A type 3 IOI is communicated between the S-CSCF or I-CSCF of the home operator network and any application server (AS). This parameter can be exchanged in all session-related and session-unrelated requests and responses. Each entity that processes the SIP request can extract the IOI attribute for possible later use in a call data record (CDR).

For example, a session initiation protocol (SIP) session can have an originating IMS network (N1), two concatenated transit IMS networks (N2 and N3) and a terminating IMS network (N4) involved. The terminating network (N4) can provide an application server (AS) in a proxy mode, the application server belonging to a third party service provider network N5.

In the examples given in FIGS. 2 and 3 abbreviated names for the IOI signalling transferred are used such that IOI txNy means that a type x IOI of the network y is included in the message. Thus e.g. SIP invite message 2 of FIG. 2 contains IOI type 2 of network 1 and type 4 of network 1. It is also noted that since this example concentrates only on the Inter-Operator-Identifiers (IOIs) relevant for the transit IMS, any of the visited networks and the handling of type1 IOIs is not discussed in any detail.

In the embodiments described in detail below extensions to already defined IMS charging mechanisms are provided. These modifications provide inter-operator accounting for transit IMSs used in a SIP session/transaction. A transit functionality is provided that can provide an intermediary role of the transit operator in the inter-operator accounting (charging). This intermediary role may be made an optional feature. When processing SIP sessions/transactions, the transit IMS node can then handle parameters such as inter-operator-identifiers (IOIs) in accordance with its accounting role.

An IMS network operator may provide transit functionality to other network operators. The transit network may have inter-operator accounting role. An operator who provides IMS transit functionality may follow different approaches regarding the inter-operator accounting. One of the issues to be decided is whether the transit IMS network operator provides an intermediary role in the inter-operator accounting or not. In most cases, the calling party pays for the use of resources and any charges are collected by the originating network operator. Part of the revenues may then be transferred to the operators of other networks participating in the service implementation, e.g. transferring and/or terminating a SIP session/request, as a part of a settling process.

If a transit operator is involved, it may assume different roles depending various factors and in response to predefined events. According to a possibility a network operator may decide to play an intermediary role in all cases when it provides a transit IMS function. The intermediary role means that the originating network operator can provide inter-operator accounting operations only with a transit network operator regarding all the destinations that are reached via this transit network. The revenue is shared between the originating network and the transit network. The transit operator may have an opportunity for a further revenue sharing based on their own accounting agreement with the terminating operators.

In accordance with an embodiment, if a controller node of a transit network assumes an intermediary role, the controller of the transit network then exchanges its type 2 inter operator identifiers (IOIs) with the controllers of the originating and terminating networks. If no intermediary role is involved, the controller of the transit network can forward the type 2 inter operator identifiers (IOIs) received from the originating and terminating networks in a transparent way.

In the latter case, a new inter operator identifier (IOI) type 4 attribute may be provided to reflect the "pure transit" (i.e. not an intermediary) IMS role. This attribute can then be exchanged between the originating and/or terminating networks and a transit network. The IOI exchange mechanism used for type 4 inter operator identifiers (IOIs) can also be used for applications where the originating network's type2 IOI attribute needs to be used for some reason.

The approach followed for accounting may have consequences for the transit node, for example a transit-CSCF, functionality for serving SIP INVITE sessions. It is noted that other methods can be supported as well, e.g. similar cases for the charging of SIP MESSAGE sessions. In the current proposals the transit IMS has a role only in routing the initial SIP INVITE and any of the nodes of the transmit IMS do not necessarily participate in the further processing. The accounting intermediary role, however, may require that a node of the transit IMS can collect charging information about the whole SIP INVITE session. More specifically, the transit node may need to collect information about the session duration, media composition and possible session modifications. For these, it may be necessary to Record-Route the SIP INVITE session and to process all of the further SIP signalling in the session.

More particularly, FIG. 2 illustrates exchange of IOI attributes in a case where transit IMS networks act as accounting intermediaries in accordance with the above. Accounting may need to take place between a number of networks, namely between networks N1 and N2, between networks N2 and N3, between networks N3 and N4 as well as between networks N4 and N5. The accounting role of the transit IMS needs to be reflected by the exchange of the type-2 IOI attributes. For that purpose it is possible to extend handling of the signalling. For example, handling of the type-2 IOIs as defined in 3GPP standards can be extended in the following manner.

After network N1 it has received the initial INVITE request, the S-CSCF in network N1 inserts its type2 IOI as orig-IOI in the INVITE request to the transit-CSCF in network N2. In FIG. 2 this is shown as IOI t2N1 in message 2. The transit-CSCF of Networks N2 may need to store the orig-IOI and include it in its charging records/messages. The transit-CSCF then sends its own type-2 IOI as orig-IOI in the INVITE forwarded to the N3 network in message 3.

Similar procedure may be provided in a CSCF of the second transit network N3. The received type 2 orig-IOI is stored and the type 2 orig-IOI of the CSCF of the second transit network N3 is inserted in the forwarded request in message 4.

An interrogating controller, for example an I-CSCF, in the network N4 (this entity is not shown in FIG. 2) may then forward the INVITE message to the terminating serving CSCF (T-S-CSCF) serving the called user. The S-CSCF can store the orig-IOI attribute it received and include the attribute into charging records/messages it generates.

The S-CSCF of network N4 forwards the request to the application server (AS) in network N5, including the received orig-IOI of type 2 and its own IOI of type 3 in message 5. The type 2 IOI is also forwarded to the application server (AS) if it provided the IMS gateway function (GWF) towards originating control server (OCS). This information may also be needed for backward compatibility, for example towards other application servers.

The application server (AS) forwards the request back to the terminating S-CSCF in message 6. The terminating S-CSCF then forwards it towards the called party in message 7. When the terminating S-CSCF receives the 200OK response in message 8, it forwards it to the application server (AS), including its type 3 IOI attribute as term-IOI attribute in message 9.

The application server (AS) then forwards a response back to T-S-CSCF in message 10. This node then sends the response further back to the transit-CSCF in network N3, including its type 2 IOI attribute as term-IOI in message 11. The transit-CSCF of network N3 stores the term-IOI of type 2 and includes the attribute in its charging records/messages. When forwarding the SIP response towards the first transit network N2, the transit-CSCF of network N3 can include its own type 2 IOI attribute as term-IOI in message 12.

A transit-CSCF may need to store two pairs of type2 IOI attributes. A transit-CSCF may also need to differentiate between those attributes belonging to the originating and the terminating operators. This may require an extension in the call data record (CDR) content and the involved protocol, for example Diameter protocol.

According to an embodiment a new attribute value pair (AVP) is included to the Inter-Operator-Identifier attribute value pair besides the Originating-IOI/Terminating-IOI attribute value pairs. This pair can be termed e.g. "Accounting-Direction". This attribute value pair may have the values 'UPSTREAM' to reflect that the IOI serves for accounting with the originating/previous transit IMS (revenue share to be received) or 'DOWNSTREAM' for the opposite. The added new AVP can be defined as an optional feature.

The S-CSCF in the originating network (N1) can store the type 2 IOI of the network N2 received in message 13 as term-IOI attribute. The S-CSCF in the originating network (N1) can also include the type 2 IOI of the network N2 into its charging records/messages. A confirmation to the originator may then be transmitted in message 14.

It is noted that the IOI attribute handling described above may require modified functionality only from the transit-CSCFs.

FIG. 3 illustrates the scenario where handling of IOIs is provided in case of direct accounting between originating and terminating network operators, i.e. shows a way of IOI attribute exchange when a transit network assumes that it does not have an intermediary role. In this case, the originating operator shares the revenues collected from the subscribers to the terminating network operators directly i.e. has an accounting agreement with all the terminating operators. This may be provided e.g. based on services of a clearing house. Note that also in this case the transit network operator may have the expectation of receiving its share for routing the SIP sessions/transactions, i.e. accounting may needs to take place between the originating and terminating operator as well.

Again, it is assumed in the example that a direct accounting relation is in place between originating and terminating operators. Therefore in the shown scenario accounting takes place between networks N1 and N4, as well as between networks N1 and N2, between networks N2 and N3, and between networks N4 and N5. It is also assumed that if there are two transit network operators involved, they will provide accounting functions themselves and that the originating operator should have accounting relation with the operator of the first transit network.

The lack of the intermediary accounting role of the transit IMS is reflected by the manner the type-2 IOI attributes are exchanged. This means that when type 2 IOI attributes are exchanged between networks N1 and N4, any transit network in between simply forwards this information unchanged. On certain application, however, accounting information may need to be stored in the involved transit networks. In FIG. 3 embodiment a type 4 IOI attribute is provided for this purpose. This IOI attribute is exchanged "hop-by-hop" over the different networks. In this scenario nodes such as I-CSCFs and topology hiding internetwork gateways (THIGs) between the networks can be considered as a part of a hop.

After having received the initial SIP INVITE request in message 1, the originating serving CSCF (O-S-CSCF) in network N1 inserts its type2 IOI attribute as orig-IOI in the SIP INVITE request to the transit-CSCF in network N2 for sending in message 2. If the O-S-CSCF is aware of the fact that it is sending the INVITE request to a transit network, it can add its type-4 IOI attribute into message 2 as well. The encoding of the type 4 IOI attribute can be similar to encoding of the type 1 and type 3 IOI attributes. In this case the attribute may contain a prefix "type 4" or similar indicator of its type.

The transit-CSCF of network N2 receives and stores the type 4 IOI attribute. The transit node can also include the attribute in its charging records/messages. Optionally, the type 2 IOI attribute may be stored as well.

If the originating S-CSCF cannot recognise that a transit IMS is involved to the session processing, then the transit-CSCF may not be provided a type 4 IOI attribute. In this case, the transit-CSCF stores the received type 2 IOI attribute as a type 4 IOI attribute. The transit-CSCF may add the "type 4" prefix to the type 2 IOI attribute. Note that this may set limitations for the type 4 IOI attributes used. For example, the type 4 IOI attributes may need to be connected to type 2 IOI attributes of the same network.

The transit-CSCF of network N2 inserts the received type 2 IOI of network N1 and its own type-4 IOI as orig-IOIs in the SIP INVITE forwarded in message 3 to the next or second transit network N3. A similar procedure is then provided in the CSCF of the second transit network N3. The received type 4 orig-IOI attribute is stored and type 4 as well as the received type 2 IOI attributes are inserted as orig-IOIs in the forwarded request in message 4.

I-CSCF in network N4 (not shown in the FIG. 3) may forward the INVITE in message 4 to the terminating S-CSCF serving the called user. The terminating S-CSCF stores both the type 2 and type 4 orig-IOI attributes received and includes them into the charging records/messages it generates. If the T-S-CSCF does not support type 4 IOI attributes, it can silently discard the received type 4 IOI attribute.

Note that forwarding of type 4 IOI attributes towards the terminating network N4 may be required only for ensuring accounting also in applications where reverse charging us used. Optionally, the transit IMS may not need to include its type 4 IOI attribute if it has identified that it forwards the request to a terminating network and no reverse charging is invoked for the session.

The T-S-CSCF forwards the request to the application server (AS), including the received orig-IOIs of type 2 and type 4, as well as its own IOI of type3 in message 5. The application server can then forward the request back to the terminating S-CSCF in message 6. The terminating S-CSCF then forwards the information towards the called party in message 7.

When the terminating S-CSCF receives the 200OK response in message 8, it can forward the response to the application server, including its type 3 IOI attribute as term-IOI attribute in message 9. The application server (AS) forwards the response back to T-S-CSCF in message 10. The terminating S-CSCF can then send the information further back to the transit-CSCF of network N3, including its type 2 IOI attribute and type 4 IOI attribute as term-IOI attributes in message 11. If the S-CSCF does not support type 4 IOI attributes, it can send only its type 2 IOI attribute.

The transit-CSCF stores the term-IOI of type 4 and include it in its charging records/messages. When forwarding the SIP response towards the first transit network N2, it will include its own type 4 IOI attribute as well as the received type 2 IOI attribute as term-IOI attributes in message 12. If the transit CSCF has not received type 4 IOI attribute as term-IOI attribute, it can use the received type 2 IOI attribute, as described earlier.

The S-CSCF in the originating network (N1) stores the received type 2 and type 4 IOI attributes as term-IOI attributes and includes these into its charging records/messages. If this S-CSCF supports type 4 IOIs, it may need to detect that a transit IMS is involved from the received type 4 IOI. It may also need to store its own type 2 IOI as a pair of this type IOI. It may add a prefix "type 4" to it.

The transit network operator may also want to be able to operate in accordance with either of the above options, for example depending on the other networks involved in a session. The option chosen may depend on e.g. whether the originating and terminating operators have a direct accounting agreement, or e.g. whether the transit operator provides user plane routing as well. In this instance it may be necessary to assure that the approach to be followed will be unambiguously defined for each originating-transit-terminating relationship.

For example, in case a transit network N2 can have an accounting intermediary role depending on the N1 and N3 networks involved in a session. To be able to operate correctly, it needs be able to identify its actual role in each session. The transit network may do this by analyzing the domains in the originating and terminating side. It can store the combinations for which it needs to work as intermediary, and if that role is identified, it may operate as described with reference to FIG. 2. Otherwise it can operate as described with reference to FIG. 3.

Figure 4:
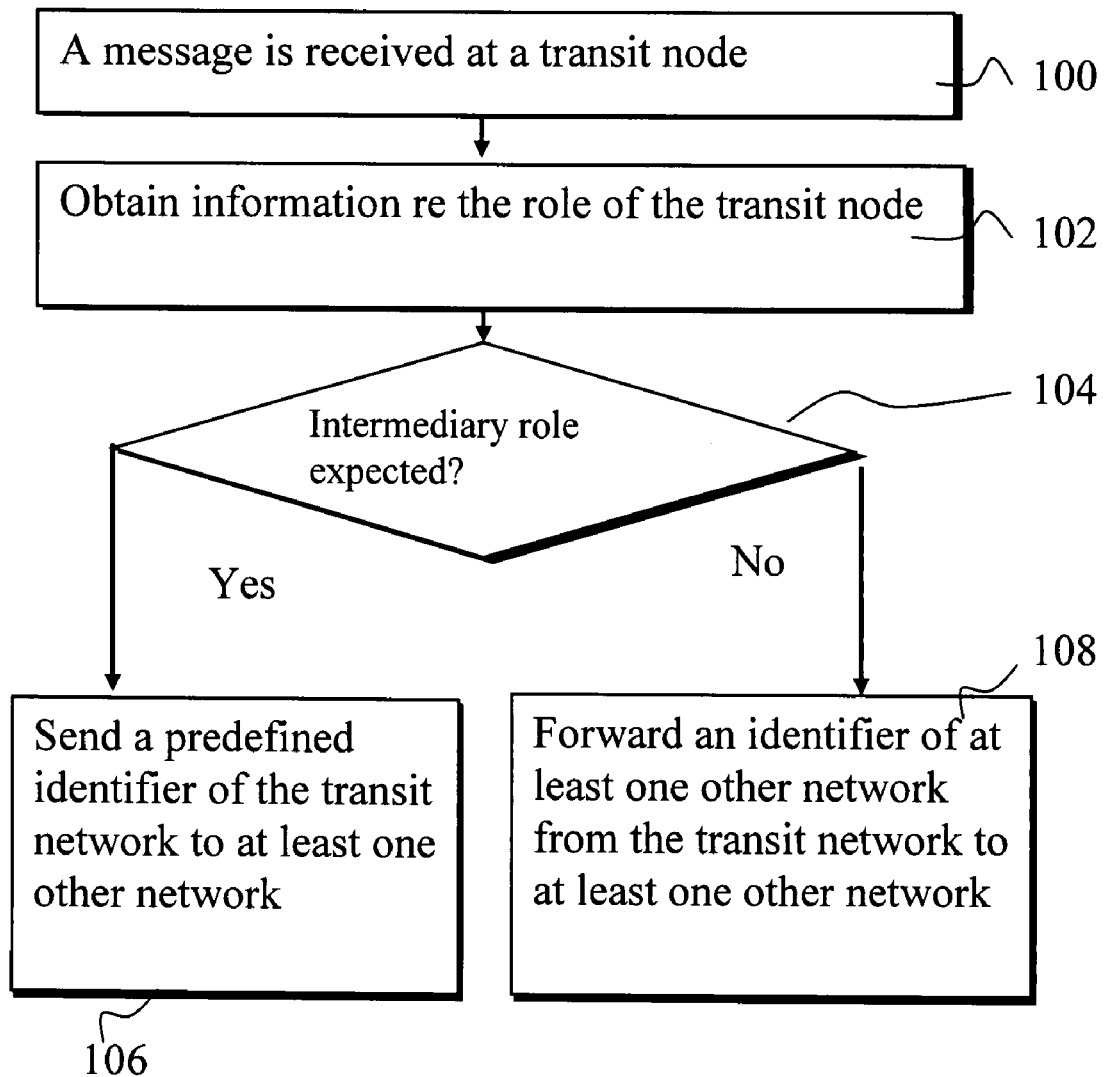
FIG. 4 is a flowchart for a possible embodiment.

An example for operation of a transit node is shown in the flowchart of FIG. 4. In the example a message is received in a node of a transit network at 100. The message may come from an originating network, another transit network, or from a terminating network, see FIGS. 2 and 3. At 102 information about the expected role of the transit node in inter-operator accounting is obtained from the message. For example, the node may analyse the type of the IOI identifier to determine how it shall handle the accounting. Once the role of the node in inter-operator accounting is determined at 104, the node may send a predefined identifier of the transit network to at least one other network in response to determination that the transit network node has an intermediary role, see 106. If the determination was that a non-intermediary role shall be taken, the node forwards an identifier of at least one other network from the transit network, see 108.

In scenarios where two or more transit networks are involved, it is possible that only one or some of them operate as an accounting intermediary, while the other(s) do not. The requested identifier handling can be provided in each of the networks as described above. For example, each transit-CSCF handles the IOI attributes according to its own role in the accounting process.

It is noted that the any number of transit networks may be employed, FIGS. 1, 2 and 3 being only examples of communications involving two transit networks.

The solution described here can be used for SIP transactions that are not related to a particular session as well.

The required data processing functions of the nodes involved in the accounting may be provided by means of one or more data processors. An appropriately adapted computer program code product or products may be used for implementing any of the embodiments, when loaded on an appropriate processor. The program code means may, for example, perform at least one of the task of detection a relevant attribute, interpretation thereof, controlling storing thereof, controlling inclusion of an attribute into messages, sending and receiving information, interpretation of information and so forth. The program code product for providing the operation may be stored on and provided by means of a carrier medium such as a carrier disc, card or tape. A possibility is to download the program code product to a node via a data network.

The embodiments described above may allow a session to be setup between users subscribing to operators who have no accounting agreement while ensuring the accounting can take place via a transit operator participating in the session. The embodiments may allow direct charging operations between operators even if they invoke a transit network in setting up a session. This scenario may be particularly useful during introduction of new networks and/or updates, as not all operators involved with the communication session may support all possible required parameters and functions. Routing functionality may be invoked for all sessions, even though accounting may only be provided in certain destinations.

It is noted that although certain embodiments were described above by way of example with reference to the exemplifying architectures of certain communication system, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

We claim:

1. A method comprising:
   receiving a message in a transit network node of a transit network;
   obtaining from the message information about a role expected of the transit network node in inter-operator accounting;
   determining the role of the transit network node in inter-operator accounting; and
   subsequently either sending a predefined identifier of the transit network to at least one other network in response to determination that the transit network node has an intermediary role or forwarding an identifier of at least one other network from the transit network in response to determination of a non-intermediary role.

2. The method of claim 1, comprising determining the role based on an identifier associated with a network.

3. The method of claim 2, wherein the identifier comprises an inter operator identifier.

4. The method of claim 3, wherein the sending the predefined identifier of the transit network comprises sending a type 2 inter operator identifier to at least one of a controller node of an originating network, a controller node of another transit network, and a controller node of a terminating network.

5. The method of claim 3, wherein the forwarding the identifier of the at least one other network comprises transparently forwarding a received type 2 inter operator identifier of at least one other network to at least one of a controller node of an originating network, a controller node of another transit network, and a controller node of a terminating network.

6. The method of claim 1, comprising exchanging an identifier attribute reflecting a non-intermediary role between the transit network and at least one of an originating network and a terminating network.

7. The method of claim 1, comprising sending an indication of accounting direction to a charging domain.

8. The method of claim 7, comprising attaching a direction attribute to an inter operator identifier attribute.

9. The method of claim 7, wherein the indication of the accounting direction comprises an indication if the information is associated with a network that is located before or after the transit network.

10. The method of claim 1, wherein the obtaining information comprises obtaining said information from a session initiation protocol message.

11. An apparatus comprising:
a transit network node configured to at least provide an intermediary in an inter-operator accounting, the transit node being configured to obtain information regarding an expected role of the transit network node in inter-operator accounting and to provide inter-operator accounting based on the information such that a predefined identifier of the transit network is sent to at least one other network in response to determination that the transit network node has an intermediary role or an identifier of at least one other network is forwarded to at least one other network when a non-intermediary role is assumed.

12. The apparatus of claim 11, wherein the transit network node is further configured to determine the role based on an identifier associated with a network.

13. The apparatus of claim 11, wherein the transit network node is further configured to send the predefined identifier of the transit network to at least one of a controller node of an originating network and a controller node of a terminating network.

14. The apparatus of claim 11, wherein the transit network node is further configured to transparently forward the identifier of the at least one other network to at least one of a controller node of an originating network and a controller node of a terminating network.

15. The apparatus of claim 11, wherein the transit network node is further configured to trigger the intermediary role in response to a predefined event.

16. The apparatus of claim 11, wherein the transit network node is further configured to process an indication of accounting direction.

17. An apparatus comprising:
a node for a communication system comprising at least an originating network, a transit network and a terminating network, wherein the node is configured to at least process information regarding expected inter-operator accounting role of a node in the transit network by at least one of including into a message the information and interpreting from the message the information, wherein the node is further configured to exchange the message with the transit network.

18. The apparatus of claim 17, wherein the node is further configured to insert and interpret the role based on an identifier associated with a network.

19. The apparatus of claim 17, wherein the message comprises a session initiation protocol message.

20. A communication system comprising:
an originating network;
a transit network; and
a terminating network;
wherein the originating network and the terminating network each comprise a node configured to at least process information regarding expected inter-operator accounting role of a first node in the transit network by at least one of including into a message the information and interpreting from the message the information, and
wherein the transit network comprises a second node configured to obtain information regarding the expected role of the second node in inter-operator accounting and to provide inter-operator accounting based on the information such that a predefined identifier of the transit network is sent to at least one other network in response to determination that the second node has an intermediary role and an identifier of at least one other network is forwarded to at least one other network when a non-intermediary role is assumed.

21. A machine readable medium including program code which when executed by a processor causes operations comprising:
obtaining from a message received in a transit network node of a transit network information about a role expected of the transit network node in inter-operator accounting;
determining the role of the transit node in inter-operator accounting; and
subsequently either sending a predefined identifier of the transit network to at least one other network in response to determination that the transit network node has an intermediary role or forwarding an identifier of at least one other network from the transit network in response to determination of a non-intermediary role.

22. The program product of claim 21, further causing analyzing an indication of accounting direction.

23. An apparatus comprising:
at least one processor;
and at least one memory including code which when executed by the processor causes operations comprising:
receiving a message in a transit network node of a transit network;
obtaining from the message information about a role expected of the transit network node in inter-operator accounting;
determining the role of the transit network node in inter-operator accounting; and
subsequently either sending a predefined identifier of the transit network to at least one other network in response to determination that the transit network node has an intermediary role or forwarding an identifier of at least one other network from the transit network in response to determination of a non-intermediary role.

24. The apparatus of claim 23, wherein the apparatus is further configured to determine the role based on an identifier associated with a network.

25. The apparatus of claim 23, wherein the apparatus is further configured to send the predefined identifier of the transit network to at least one of a controller node of an originating network and a controller node of a terminating network.

26. The apparatus of claim 23, wherein the apparatus is further configured to transparently forward the identifier of the at least one other network to at least one of a controller node of an originating network and a controller node of a terminating network.

27. The apparatus of claim 23, wherein the apparatus is further configured to trigger the intermediary role in response to a predefined event.

* * * * *